(12) United States Patent
Kane et al.

(10) Patent No.: US 7,569,094 B2
(45) Date of Patent: Aug. 4, 2009

(54) METHOD AND APPARATUS FOR SEPARATING PARTICLES

(75) Inventors: John E. Kane, Houston, TX (US); Robert L. Hance, Austin, TX (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 313 days.

(21) Appl. No.: 11/481,778

(22) Filed: Jul. 6, 2006

(65) Prior Publication Data

US 2008/0009402 A1    Jan. 10, 2008

(51) Int. Cl.
*B03C 1/00*    (2006.01)
*B03C 3/00*    (2006.01)
*B01D 45/12*   (2006.01)

(52) U.S. Cl. ............... 95/28; 95/63; 95/270; 95/272; 96/1; 96/2; 96/3; 96/61; 55/406

(58) Field of Classification Search ............ 55/400, 55/406–408, 447, 456; 95/28, 261, 267, 95/269, 270, 63; 96/1, 2, 208, 214, 216, 96/217, 3, 61; 210/222, 223, 787, 512.7; 494/37, 43, 50–54
See application file for complete search history.

(56) References Cited

U.S. PATENT DOCUMENTS

| | | | | |
|---|---|---|---|---|
| 3,857,687 A | * | 12/1974 | Hamilton et al. | 55/337 |
| 4,877,431 A | * | 10/1989 | Avondoglio | 55/321 |
| 5,428,220 A | * | 6/1995 | Ehara | 250/281 |
| 6,802,881 B2 | * | 10/2004 | Illingworth et al. | 55/394 |

FOREIGN PATENT DOCUMENTS

GB    1573984    *    3/1976

OTHER PUBLICATIONS

"Submicrometre Particle Separation Via High-Speed Gas Centrifuges", Hitchings et al., Proc Instrn Mech Engrs vol. 211 Part E, pp. 17-29 (1997).
"Process Synthesis For Particle Separations Using Centrifuges", Agena et al., Computers Chem. Engng vol. 22 No. 3, pp. 351-356 (1998).

* cited by examiner

*Primary Examiner*—Duane Smith
*Assistant Examiner*—Sonji Turner
(74) *Attorney, Agent, or Firm*—Browning Bushman P.C.

(57) ABSTRACT

A method and apparatus for separating particles preferentially accelerates particles to a rotating collector, which then reliably conveys collected particles to a discharge with minimal re-entrainment of the particles in the fluid stream. The collector minimizes energy transfer to the fluid and maximizes separation under conditions of high particle loading, fine particle content, or both. The separator may be operated in any vertical, horizontal or oblique orientation, or within devices whose orientation varies over time.

17 Claims, 5 Drawing Sheets

METHOD AND APPARATUS FOR SEPARATING PARTICLES

FIELD OF THE INVENTION

The present invention relates to techniques for separating particles, such as solids or liquid droplets, from a gas. More particularly, the invention relates to more effectively processing gas streams containing a high mass content of particles and/or particles not easily separable, such as sub-micron or high aspect ratio particles.

BACKGROUND OF THE INVENTION

Two-phase (e.g., gas-solid, gas-liquid) flows are ubiquitous across a broad range of manufacturing, agricultural, medical and military applications. In many instances, the flow is intentional and controlled, as in pneumatic conveyors, pesticide applicators or drug delivery devices. In other applications, a gas contaminated with entrained particles/droplets must be refined, or particles/droplets entrained in a gas must be recovered for some further use. As used herein, a "particle" refers to both solid particles and liquid droplets.

Across these applications, there is often a requirement to continuously and reliably separate particles from the entraining gas. A subset of this separation requirement is to classify the removed particles by characteristics, such as size, density, morphology, etc. A variety of structural filters and mechanical separators have been developed for these purposes and, in most applications, they meet or exceed performance requirements.

"Structural filters" refers to passive devices that retain particles in restricted passages or on large surface areas. Screens, membranes and paper or fiber filters are examples of this category. Structural filters have a capacity limit in terms of total allowable mass of captured particles. Once the limit is reached, it must be cleaned or replaced.

"Mechanical separators" refers to devices that induce a differential velocity or vector between the gas and particle. These include devices either with moving parts (such as rotors) or without them (such as vortex or electrostatic or magnetic units). Most mechanical separators continuously discharge particles, so they avoid the mass capacity limitation of structural filters. However, these devices have inherent restrictions on the maximum concentration of particles (mass per unit volume of gas) which they can efficiently process.

Since mechanical separators depend largely on gravity flow, their chamber geometry must address the collected particles' angle of repose and minimum allowable throat dimensions to prevent clogging and bridging within the device. Therefore, angles are typically steep, throats wide and orientation almost always vertical. The configuration of these systems, and the turbulent flows within them, often results in re-entrainment of separated particles, especially under conditions of high loading or contained nano-particles.

In applications where either particles are very fine or the particle loading is quite high, or both, structural filters and conventional mechanical separators may not be economical or may fail altogether. This is becoming increasingly evident in applications as diverse as nanoparticle processing and desert military operations.

Several mechanical separators utilize vortex chambers or electrostatic/magnetic repulsion/attraction to separate two-phase flows into their constituent gas and solid (or liquid) components. These designs typically create a differential velocity and/or vector between the gas and entrained particles. In this manner, particles are concentrated at a collection point and discharged.

However, nano-sized particles are essentially the size of smoke particles, which are easily suspended in flowing gas. Structural filters may be effective in removing nano-particles from air, but there are problems with pressure drop (energy loss), system volume and "harvesting" particles from the filter. Mechanical separators typically create high velocity tangential flows and require particles to travel relatively long distances (several million diameters for micron-sized particles, several billion diameters for nano-particles). Both of these conditions assure that a high fraction of nano-particles will not be separated from the flow.

Several nanoparticle separator systems create, at some point in the process, a two-phase gas-particle flow. Recovering particles from the gas stream may be necessary for consolidation, packaging or other finishing operations. If particles are released to the atmosphere, industrial hygiene requirements often dictate their removal down to a very low concentration in air.

Military operations are completely dependent on equipment that can be quickly degraded by sand and dust. In desert operations, wind-borne sand damages engines, driven components and electrical devices. There is not only a tremendous volume of solids to remove, there is a considerable fraction of solids in the nano-scale range. As a result, structural filters are changed very frequently, with limited success at capturing nano-scale particles. Mechanical filters exhibit two principal shortcomings—poor performance rejecting fine dust particles and excessive wear on fan blades and guide vanes from sand erosion. Personnel safety and hygiene considerations apply here as well; clean air is essential for living, working and medical spaces.

Prior art separator designs have limited ability to process large mass flows having very high solids loading or that contain nano-scale particles. Further, conventional mechanical separators may require large internal volumes or substantial energy to accelerate the gas-solid stream being treated. Relevant information regarding particle separation in a gas stream is disclosed in the articles entitled "Submicrometre Particle Separation Via High-Speed Gas Centrifuges", Hitchings et al., Proc Instrn Mech Engrs Vol. 211 Part E, pp. 17-29 (1997), and "Process Synthesis For Particle Separations Using Centrifuges", Agena et al., Computers Chem. Engng Vol. 22 No. 3, pp. 351-356 (1998).

The disadvantages of the prior art are overcome by the present invention, and an improvement and apparatus are hereinafter disclosed for separating particles from a gas stream.

BRIEF SUMMARY OF THE INVENTION

Processing highly-loaded flows, separating nano-scale particulates from a gas stream and reducing the size and energy requirements of a mechanical separator are all desirable features of the separator. The separator effectively creates a differential velocity vector between the flow components, requires relatively lower energy input, and remains effective when high loading or nano-scale particles are present.

In one embodiment, the separator consists of a housing with a fluid/particle inlet and a fluid discharge, and a vane arrangement nested within a rotating hollow collector. The axis of the vane arrangement and of the rotating collector are coincident. The vanes may be disks or may be frusto-conical, spherical or parabolic sections positioned along and attached to a common central axis. The vanes may be arranged so that flow is forced to periodically reverse its radial direction as it travels axially through the device.

These and further features and advantages of the present invention will become apparent from the following detailed description, when reference is made to the figures in the accompanying drawing.

BRIEF DESCRIPTION OF THE DRAWINGS

FIG. 3a provides an end view of vanes 44 and 46, illustrating the direction of flow across the upstream face of each vane. FIG. 3b illustrates the addition of features on vanes 44 or 46 to control the direction and velocity of radial flow.

DETAILED DESCRIPTION OF PREFERRED EMBODIMENTS

The new mechanical filtration separator is capable of collecting both fine, sub-micron particles and very high volumes of entrained solids. Further, it accomplishes these objectives with a relatively low energy input, less turbulent flow and using a more compact construction as compared to conventional mechanical separators.

In a preferred embodiment, the separator is a reversing flow, rotating collector that uses a static interior vane assembly that reversibly directs fluid-solids flow in radial directions, first toward and then away from the inside wall of a rotating hollow collector. The non-rotating, axially coincident vane assembly may include a plurality of vanes. The vanes may be disk, conical, spherical or parabolic shaped, with each vane having a substantially outer edge. The vane assembly may be nested inside the rotating cone, such that gas-solids mixtures are repeatedly directed to reverse flow (from radially outward to radially inward) in the vicinity of the rotating wall.

Gas-solids flow may be established by creating a pressure differential across the separator, for instance by using a fan, pump or the intake of an internal combustion (reciprocating or turbine) engine. A fan may be integral to the device, utilizing a means to connect the rotating collector to the fan shaft.

Figure 1:
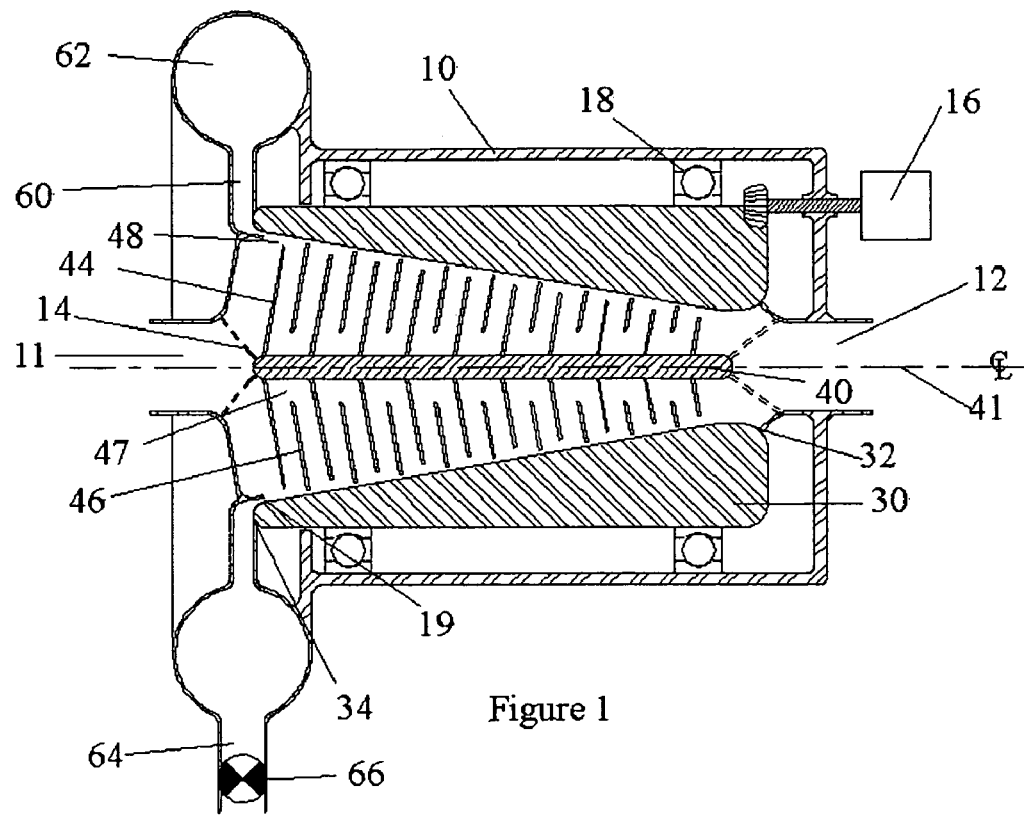
FIG. 1 depicts a lateral cross section view of one embodiment of a separator, consisting of a housing which supports bearings that permit rotation of a collector.

FIG. 1 depicts a separator housing 10 with bearings 18 that permit rotation of a collector 30. Drive 16, which may be an electric, hydraulic or pneumatic motor, provides the motive force for rotation. In operation, gas-solids flow enters the device through opening 11 and cleaned gas exits through opening 12. A feature of this separator is its capability for bi-directional flow, i.e., gas flow may be from opening 11 to opening 12, as disclosed above, or gas flow may alternately enter through opening 12, and gas may be discharged through opening 11, as explained further below. This bi-directional flow capability allows one to back flush a static filter that may be part of the system without having to disconnect and reconnect the flow lines to the separator and the filter.

Figure 2:
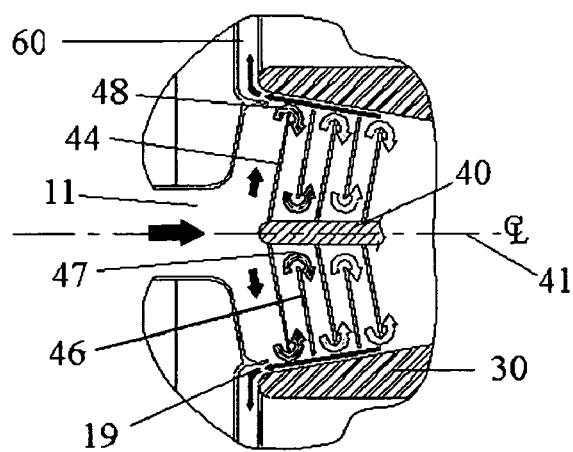
FIG. 2 illustrates reversing flow through the separator and vanes along the length of the separator.

Flow entering the device is directed in a radially reversing manner by stationary vanes 44, which are imperforate vanes, and stationary or substantially static vanes 46, which contain perforations at or near their center. Vane styles 44 and 46 alternate through the length of the device, creating the repeatably reversing flow illustrated in FIG. 2. Both vanes 44 and 46 may be fixed to the central non-rotating rod 40, which thereby comprise one embodiment of a vane assembly 42. Alternately, the vanes could be free-wheeling, i.e., allowed to rotate but not power driven. The vanes may thus be stationary or substantially stationary relative to the high speed rotation of the collector.

FIG. 3 illustrates the reversing direction of flow across the upstream face of each vane. Vane 44 directs flow radially outward toward the gap 48 between the outer edge of the vane and the inner wall of collector 30. Collector 30 rotates while vane 44 is stationary. Flow continues through that gap and encounters stationary vane 46. As the gap between vane 46 and collector 30 is much smaller, flow is directed by vane 46 in a radially inward direction to the perforations 47 (see FIGS. 1 and 3) at or near its center. Flow continues through the perforations to the successive vane 44.

Returning to FIG. 1, as the gas-solids flow passes through the device, collector 30 is rotating about the longitudinal axis of the device. Seals 32 and 34 assure that flow entering the device is forced to travel through the vane and collector arrangement. Collector 30 rotates at sufficient speed to exert force on particles that is several times the force of Earth's gravity. More particularly, the combination of the radius of the reversing flow and the tangential velocity of the particle passing through the reversing flow applies a force to the particle of from about 2 to in excess of 1,000 times the force of the Earth's gravity. Typically, this applied force is from about 4 to 500 times the force of the Earth's gravity. Solids that are separated from the gas by repeated flow reversals then accumulate on the interior surface of the collector 30 and are conveyed toward the larger inner diameter of the collector by the collector's "apparent gravity."

At the end of collector 30 having the large inner diameter, a flow diverter 19 permits passage of collected solids across its outer surface and into conduit 60. Simultaneously, diverter 19 directs gas flow either toward vane 44 if gas is toward opening 12 or toward opening 11, if gas is directed toward opening 11. Gas flow may be to either opening 11 for discharge through opening 12, or may be directed through opening 12 for discharge through opening 11. The preferred flow direction may be a function of the relative advantages and disadvantages of gas compression heating in the first embodiment, and gas expansion cooling in the second embodiment.

Conduit 60 may be a circumferential passage, as shown, or one or more radially distributed passages. Discharged solids are collected in chamber for discharge from discharge tub 64. Typically, a small portion of the gas flow, less than 10% of the flow input to the separator, passes with the discharged solids, and most of the element gas passes out the discharge of the separator. A valve 65 may be used for controlling gas flow with collected particles from the separator through opening 64.

Overall, gas flow is axial, along the central axis 41 of the fixed vane assembly. The collector permits bi-directional flow; the inlet may either be at either end of the rotating collector. Locally, gas flow is radial, following the surfaces of the vanes, and reverses frequently due to the geometry of each succeeding vane.

In operation, the gas-solids flow may impinge the front-facing surface of the first vane, directing flow toward the outer rotating wall. The end of the first vane may be located a suitable distance from the rotating wall, such that a designed volume of gas may flow around the outermost edge of the first vane and into the cavity defined by the back face of the first vane and front face of the second vane (see FIG. 2).

The edge of the second vane may be located substantially closer to, but not in contact with, the rotating collector. The gap between the edge of the second vane and the rotating wall may be sufficiently large to permit passage of particles that are sliding along the inside wall of the rotating collector. This edge may include a member for varying the gap distance, such as a flexible lip seal.

The second vane may contain perforations located at or near its center, causing flow to reverse again, as it proceeds through the perforation and enters the cavity formed between the second and third vane. Successive vanes may have alternating gap distances between the edge of the static vane and the surface of the rotating wall. That is, vanes 1, 3, 5, etc. spaced from the fluid inlet toward the fluid outlet may have a large gap for gas flow past the outer vane edge and vanes 2, 4, 6, etc. may have a small gap for permitting substantially only particle flow.

An alternative to flow impinging the front surface of the first vane is for the first vane to include an inlet. In this configuration, flow is directed through perforations in the vane and into the cavity between the first and second vane, where it is then directed radially. In this configuration, the edges of vanes 1, 3, 5, etc. may be close to the outer rotating wall and those of vanes 2, 4, 6, etc. will be further from the rotating wall.

As fluid-particle flow that is moving radially outward reaches the periphery of the vane arrangement, flow is forced by the rotating wall of collector 30 and the adjacent vane to abruptly reverse direction, i.e., to flow radially inward. The inertia of the entrained particles will tend to force particles toward the rotating wall, with many particles momentarily impacting the wall.

The combination of the outer wall's rotation speed (e.g., >100 rpm) and friction (from the wall's surface and particles already collected on the wall) tends to change the impacting particles direction from radial to tangential. Since the guide vanes are preferably static, the gas tends to continue on its radial/axial path. Rotational flow of the carrier gas may be controlled by incorporating guide fins to the surfaces of the vanes. The separator minimizes overall gas velocity by reducing or eliminating rotational gas flow. The rotating wall preferentially induces tangential particle velocity.

At a sufficient tangential particle velocity, the aerodynamic forces applied to the particle by the moving gas stream are overcome, and the particles are forced against the outer wall by the so-called "Relative Centrifugal Force." The magnitude of this force can be several times that of either Earth's gravity or the force exerted on the particle by the flowing fluid.

All particles may not attach to the wall as a result of the first gas flow reversal. Typically some particles will attach, some will slightly change direction, and the balance will remain entrained in the gas. For this reason, successive flow reversals may be employed to increase the likelihood that all particles will begin moving tangentially and attach to the collector.

Figure 3A:
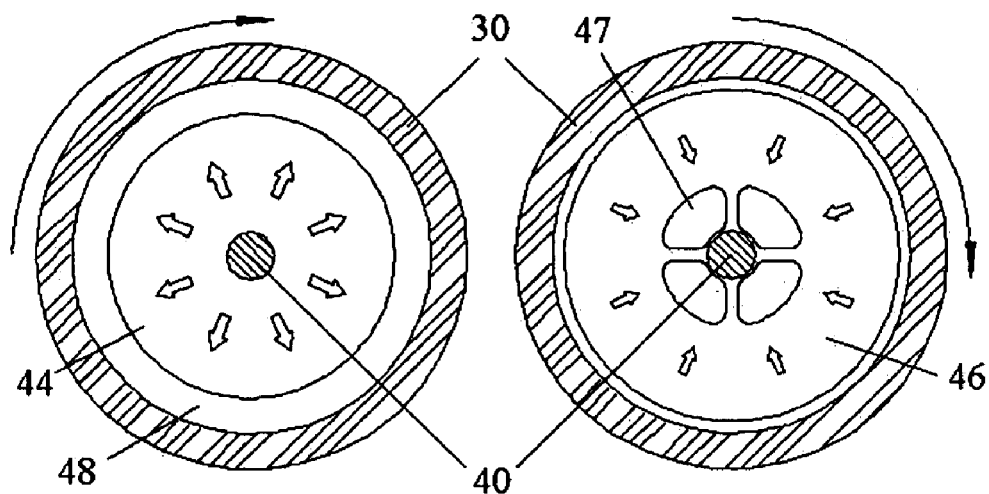
FIGS. 3a and 3b are end views of the vanes shown in FIG. 2.

Referring to FIG. 3a, vane 44 directs flow radially outward toward the gap or passage 48, where flow contacts the interior wall of the collector 30. Collector 30 rotates while vanes 44 and 46 are preferably stationary. Flow continuing through gap or passage 48 encounters stationary vane 46. Since the gap between the outer edge of vane 46 and collector 30 is much smaller, flow is directed by vane 46 in a radially inward direction to the perforations 47. Flow continues through the perforations to the successive vane 44.

Certain conditions may create the need to either promote or discourage radial flow. For instance, excessive radial flow can increase the pressure drop across the device. In other cases, radial flow may increase separation efficiency. Alternatively, reversing the radial flow direction at gap or passage 48 can increase the tendency of particles to impact collector 30.

Figure 3B:
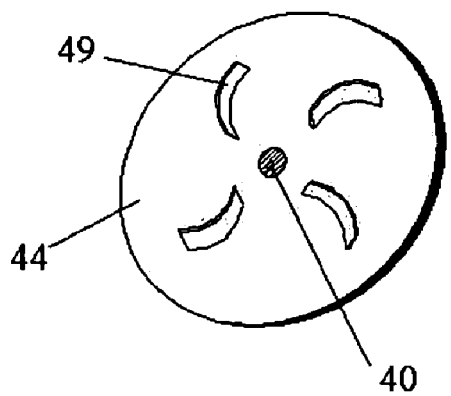

Referring to FIG. 3b, fins 49 as shown protruding from the surface of the vane. Grooves may also be used instead of fins.

Returning to FIG. 1, as the gas-solids flow transits the device, collector 30 is rotating about the longitudinal axis of the device. Seals 32 and 34 assure that flow entering the device is forced to travel through the vane and collector arrangement.

Collector 30 rotates at sufficient speed to exert force on particles that is several times the force of Earth's gravity. Solids that are separated from the gas by repeated flow reversals then accumulate on collector 30 and are conveyed toward the larger inner diameter of the collector by the collector's "apparent gravity."

At the large diameter end of collector 30, a flow diverter 19 permits passage of collected solids across its outer surface ands into conduit 60. Simultaneously, diverter 19 directs gas flow either toward vane 44 or toward opening 11, depending on the selected direction of flow.

Conduit 60 may be a circumferential passage, as shown, or one or more radially distributed passages. Discharged solids are collected in chamber or cavity 62 for discharge from discharge tub 64 through control means 66.

Figure 8A:
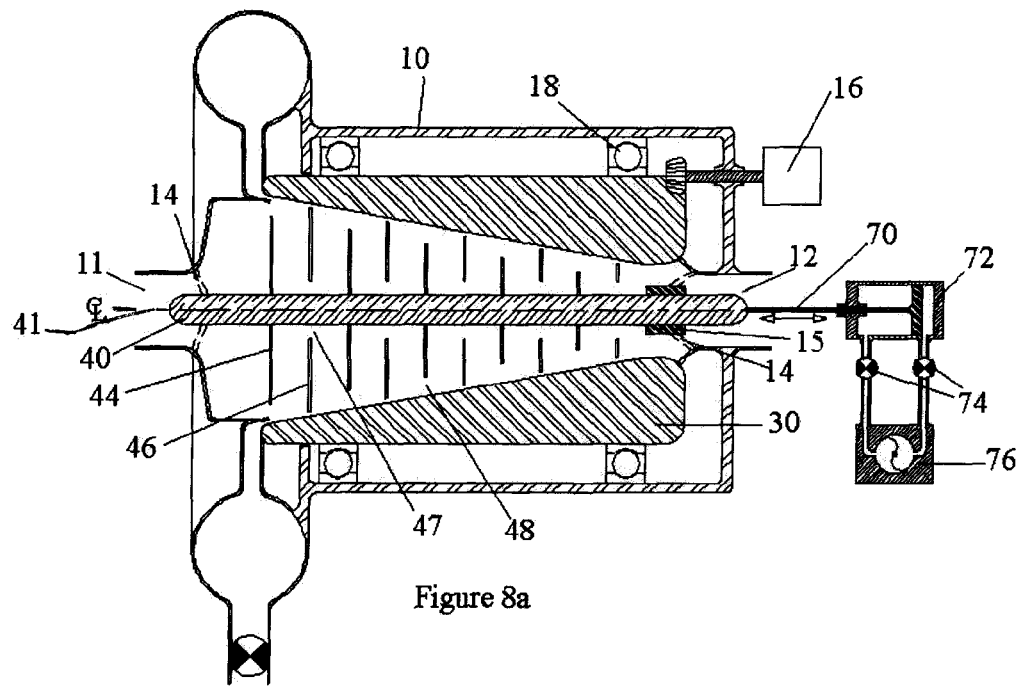
FIGS. 8a and 8b illustrate a collector with a mechanism for varying flow path dimensions.
Figure 8B:
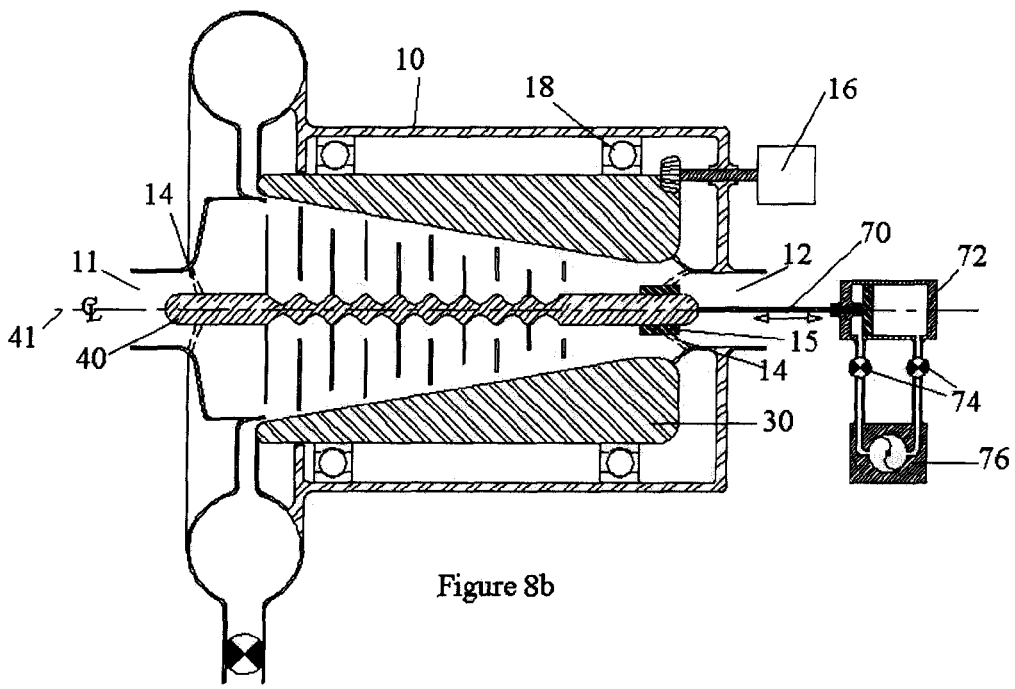

The central vanes 44 and 46 may be conical sections, curved sections, disks or shaped with variable width. FIG. 1 shows a conical section vane while FIGS. 8a and 8b show disk-shaped vanes.

Figure 4:
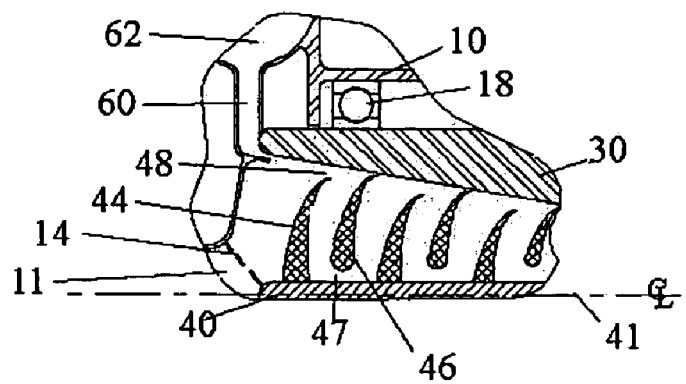
FIG. 4 illustrates curved air foil vanes.

FIG. 4 discloses a curved vane arrangement with both vanes 44 and 46 being curved, such that radially-outward flow is concentrated toward the upstream vane and, therefore, more toward the outside of the flow through gap or passage 48. Concentrating flow in this manner increases the likelihood of a particle impacting and coming to rest on the interior surface of the rotating collector 30.

Figure 5:
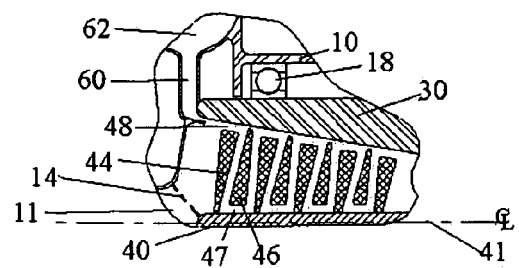
FIG. 5 illustrates one embodiment of a variable width vane for use in a separator.

FIG. 5 discloses vanes with variable width in the radial direction of the vane. The thickness of a vane at its outer edge is an important design consideration. A thinner edge increases the severity of flow reversal and, presumably, increases the population of particles impacting the outer wall at each reversal. However, a thin vane edge may also permit a particle, after impacting the wall, to rebound into the cavity immediately downstream from the vane edge, where it could be re-entrained in the flow. The thicker vane edge 44 for the imperforate vane compared to a radially central section of the vane lengthens gap or passage 48. This provides an additional impact surface for a rebounding particle, forcing the particle back toward the surface of the rotating collector 30.

FIG. 1 discloses a vane having a fixed angle at the point where it attaches to center support or rod 40. Adjusting the vane angle would change pressure drop and other characteristics across the device and/or would change the separation efficiency of certain size particles. Varying the angle may be desirable under conditions where particle characteristics differ substantially from time to time, or when the pressure drop across the device exceeds an acceptable value.

Vane deformation or flexing may also be desirable to prevent accumulation of flow-altering deposits, such as ice or viscous fluids. Periodically flexing a vane could dislodge accumulated material and restore the original dimensions of the gas flow passageway.

Figure 6:
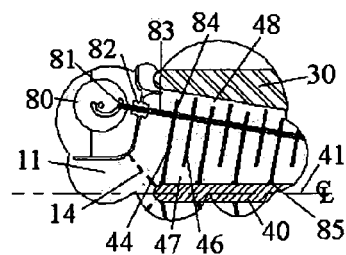
FIG. 6 illustrates a mechanism for flexing one or more vanes.

Since adjusting or flexing vanes may be desirable during operation, FIG. 6 discloses an adjustment feature consisting of connecting rod 83 attached to vanes 44 and 46, etc., by pivot 84. The vanes may also be attached to central support or rod 40 by a hinge 85 or other flexible member. Alternatively, the vanes may be constructed of a flexible material.

Connecting rod 83 travels through guide 82 and is attached to actuator 80 at guide pin 81. As actuator 80 rotates through a 180-degree range, it causes the angle of the vanes to change. An alternate actuator may be a linear motor or a hydraulic or pneumatic piston.

Figure 7:
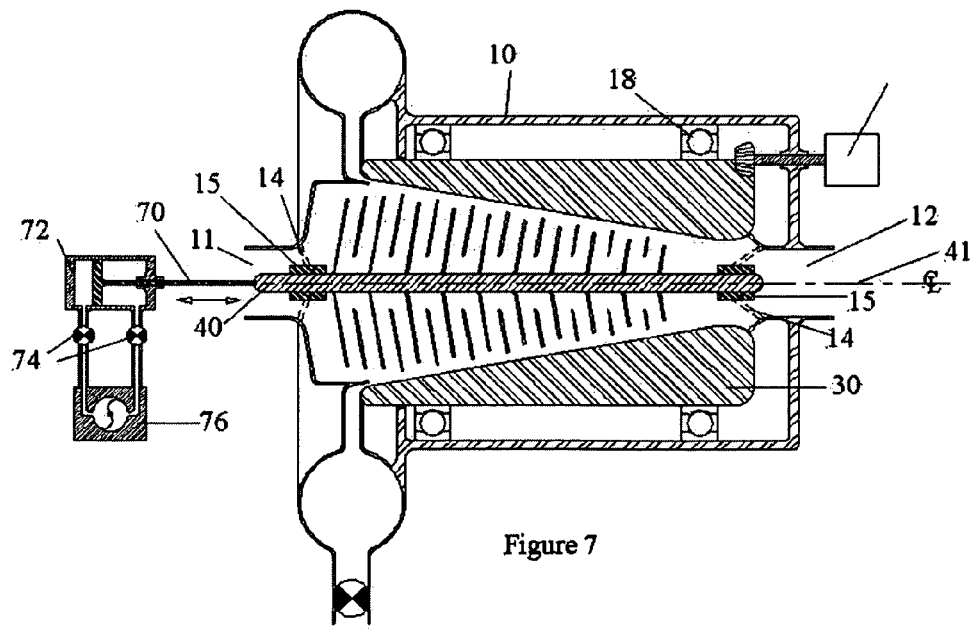
FIG. 7 illustrates a mechanism for axially adjusting the vane assembly.

The axial position of the vane assembly within the device may also be adjusted, as disclosed in FIG. 7. Changing the axial or longitudinal position of the vane assembly would alter the cross-section of passage 48, varying the velocity and pressure drop through that passage.

Referring to FIG. 7, one end of connecting rod 70 is attached to the vane center support 40. The opposite end of connecting rod 70 is a piston that travels within housing 72. A working fluid or gas is applied to either side of the piston by pump 76 and control valves 74, causing the vane support 40 to move along axis 41. Moving vane support 40 toward the small inside diameter end of collector 30 increases separation efficiency and pressure drop across the device.

An additional mechanism of varying flow path dimensions is disclosed in FIGS. 8a and 8b, which shows vane support 40 as a bellows-type device whose length may be adjusted. In one position, as shown in FIG. 8a, the support is fully extended, creating maximum separation of the vanes. Similar to the actuation in FIG. 7, a connecting rod 70 is connected to one end of vane support 40. The opposite end of vane support 40 is fixed to housing 10 by bracket 14. The end of support 40 closest to rod 70 is supported in a bearing 15, which permits movement in the axial direction.

FIG. 8b illustrates movement of connecting rod 70 to shorten the length of vane support 40, reducing the distance between each vane. This feature permits maintaining a constant gas velocity, or minimum velocity, within the device in the event that pressure differential between the inlet and outlet vary.

Inertial force of the solid particles at each flow reversal is a principal means for inducing contact between the particle and outer rotating wall. Additional means may be employed, in place of or to supplement the inertial force, such as magnetic, electrostatic or thermal. The interior surface of the rotating collector may be formed to increase surface friction with particles, e.g., by providing a rough interior surface on the collector, or may be formed to include electrostatic or magnetic forces to increase particle impact on the rotating collector. The rotating collector may have a varying diameter along its axial length to enhance particle collection, and the rotational speed of the collector may be controlled to increase efficiency.

Figure 9:
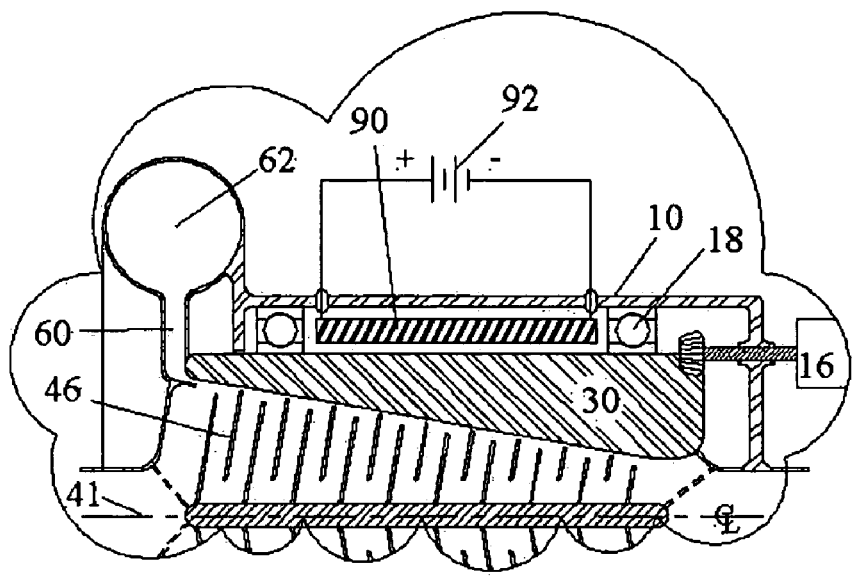
FIG. 9 illustrates a collector with an electromagnet for increasing particle attraction.

The rotating outer wall may be a magnet, or may have a magnet located outside of it, to attract magnetic particles. FIG. 9 discloses an electromagnet 90 located immediately outside collector 30, and powered by electrical source 92. A permanent magnet may also be employed.

Figure 10:
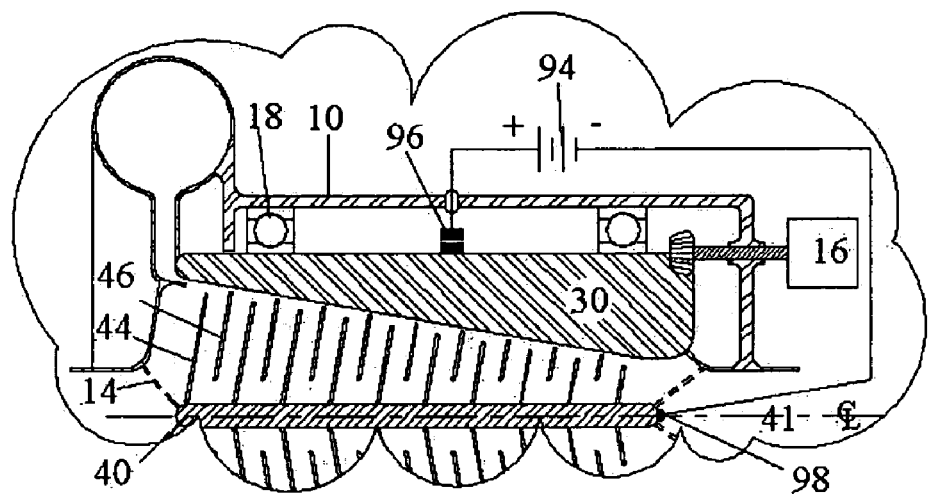
FIG. 10 illustrates a collector with an electrostatically charged collector surface.

Electrostatic force may be applied to the particle by making the vanes 44, 46 and collector 30 components of an electrical circuit. FIG. 10 discloses electrical source 94 supplying current to vane support 40 at connection 98. Particles flowing between and around the vanes are electrostatically charged. The surface of collector 30, or its entire body, is electrically conductive and equipped with an electrical contact 96 that maintains an electrical connection to source 94 during rotation. Electrostatically charged particles that attach to collector 30 transfer their charge through contact 96 to complete the circuit.

In both of these cases, the rotation speed and interior wall angle of the rotating collector 30 may be designed to exert sufficient mechanical force on the particle to assure discharge, overcoming the (magnetic or electrostatic) force that initially attracted the particle to the collector 30.

The vanes 44 having edges closer to the rotating outer wall are designed to simultaneously direct gas-solids flow across their upstream face, while permitting collected particulates to flow through the gap between the vane edge and the rotating wall. To facilitate a better seal between the vane edge and the flowing particulates, the vane 44 edge may be equipped with a flexible lip or other means to vary the distance between the vane edge and rotating wall. For instance, an expandable toroidal cavity may be attached to the vane 44 outer edge and pressured or evacuated in response to variations in the thickness of the layer of collected particles.

The inner wall of collector 30 may be configured as a single shaped section with an imperforate wall, in which case solids discharge occurs at the large diameter end of the section. Alternatively, radial discharge ports may be placed along the length of the collector to create multiple, smaller-volume discharges.

If the particles are small droplets of evaporated liquid, the outer rotating wall may be made sufficiently cold to promote condensation and coalescence of the droplets. The increased mass of the resulting coalesced particles would be more susceptible to inertial force of the reversing flow, thereby increasing the likelihood of collection.

As noted above, particles may be discharged from the end of the collector 30 having the greater inside diameter, from intermediate locations arranged radially at one or more longitudinal locations, or both. Depending on the application, particles may be discharged directly to the atmosphere, or may be collected in a housing for discharge by gravity, or by mechanical or pneumatic conveyance. For instance, particles collected in the chamber or cavity 62 can be propelled through the discharge tube 64 by a scavenger blower. The vanes of the scavenger blower can be integral with, or mechanically linked to the rotating collector 30.

As the separator does not depend on gravity to collect particles or convey them to a discharge means, the separator can be operated in any position, horizontal, vertical or oblique. Accordingly, the unit is especially suitable for use in applications where fixed-attitude mounting is not possible, such as vehicles, ships or aircraft.

Central to the operation of the separator are that 1) the substantially static vane and rotating collector design preferentially accelerates particles, transferring much less energy to the gas, 2) the change in inside diameter of the rotating collector along its length assures that captured particles are reliably conveyed to a discharge location, overcoming angle of repose limitations common to the prior art, and 3) the force exerted on the particles and boundary layer phenomena minimizes or eliminates particle re-entrainment in the gas stream. These three points are discussed further below.

1) Particle acceleration ideally is accomplished with a minimum of energy. In prior art devices, substantial energy is expended imparting rotational flow to the gas or fluid stream for the purpose of increasing the tangential velocity of the particles and forcing them to an outer (typically static) wall for collection. There are several problems with this approach.

First, gas-particle contact is a less efficient means for transferring kinetic energy than solids-particle contact. Accordingly, in a gas motive device either longer residence time or higher gas velocities (or both) are required to achieve the desired particle velocity. To increase residence time, chamber size is increased, creating longer distances for a particle to traverse before contacting the collection wall. Higher gas velocities consume more energy.

Moving the particle to the wall is not the only energy requirement of these systems. At the wall, the particle's tangential velocity must remain sufficiently high to prevent re-entrainment with the gas, but not so high as to prevent gravity discharge. Since there is differential velocity between the (moving) particle and (static) wall, system engineers must account for frictional losses in determining optimal particle speeds and energy inputs. This task is further complicated by changes in the wall's surface over time due to wear from particle impact and sliding.

The collector disclosed herein represents a significant departure from the prior art. The collector utilizes substantially static vanes, primarily to periodically reverse flow in the vicinity of the rotating outer wall. The distance a particle is required to travel at most from a vane edge to the rotating wall is substantially less than that traversed by a particle in a gas-motive device. The shorter path increases the likelihood that the particle contacts the outer (collecting) wall.

Further, the rotating wall is substantially efficient at increasing the tangential velocity of the particle with minimal energy transfer to the gas. Frictional forces from solid-solid contact are much greater than from gas-solid contact, substantially increasing the rate of energy transfer. A rotating, vaneless outer body may also achieve much higher tangential particle velocity in a given space, at lower energy expended, than a rotating vane (impeller) assembly that is also moving the gas.

There is a practical limit to the velocity of a gas in a separator before frictional losses, turbulence and/or residence time render the system uneconomical or ineffective. That limit varies with design, but will generally be some fraction of the speed of sound in the gas. For ambient, sea-level conditions, the speed of sound in air is about 340 meters/second. Achieving Mach 0.5 gas velocity could, in a sufficiently large system, accelerate particles to ~25 meters/second, but at great energy cost. In contrast, an outer wall with a 60 cm inside diameter rotating at 5,000 rpm will accelerate particles to ~160 meters/second. Higher particle velocity, in a direction different from that of the gas stream, increases both the rate and absolute value of separation.

2) Angle of repose limitations are avoided. Particles that are gravity-fed from a point discharge accumulate in a conical pile on a horizontal surface below. The angle formed between the wall of the conical pile and the horizontal surface, the angle of repose, is determined by the particle's density, surface area, coefficient of friction and the force of gravity. Although the effect of increased gravity on inter-particle friction cannot be ignored, the angle of repose is generally inversely proportional to the force of gravity.

Gravity is the principal motive force for discharge from a mechanical separator, with some designs also using residual particle velocity or pneumatic conveyance to assist flow. Since gravity is the major component, the collection wall must be constructed at an angle sufficiently greater than the material's angle of repose to assure reliable operation. Such devices typically may be mounted in only a vertical orientation.

A related phenomenon is bridging. Particles flow down the opposing sloped walls of the mechanical separator's chamber toward a discharge point. If the surfaces of these flows contact each other at some point above the discharge, the particles can interlock and form a bridge sufficiently strong to stop the solid-phase flow. Several mechanical and pneumatic devices can be used to restore flow, but their addition increases the cost and complexity of mechanical separation devices.

Relevant to this separator, nanoparticles have very high surface area and can have low bulk density and high coefficient of friction. Under normal (gravity) conditions, nanoparticles exhibit very poor flowability, high angle of repose and propensity toward bridging.

The disclosed separator may easily impose forces several orders of magnitude greater than gravity, allowing the system engineer to take advantage of both the reduced angle of repose (to provide a more compact unit) and the freedom to operate at any angle from vertical to horizontal. In the example cited above, a device having an average inside diameter of 60 cm rotating at 5,000 rpm generates the following Relative Centrifugal Force (RCF):

$$\begin{aligned} RCF &= 11.18 \times \text{Radius (in cm)} \times (RPM/1{,}000)^2 \quad \text{EQUATION 1} \\ &= 11.18 \times 30 \times (5{,}000/1{,}000)^2 \\ &= 8{,}519 \text{ g } (1 \text{ g} = \text{Earth's gravitational force}) \end{aligned}$$

Setting aside, for the moment, consideration of frictional forces between particles and between a particle and the wall, a small cone wall angle (<10°) may be used to separate, collect and discharge particles.

One of the limitations of gas-motive designs mentioned above was the velocity difference between the moving particle and static wall. In the disclosed separator, there is a relatively low velocity difference. Once the particle attaches, tangential velocities are about equal. The remaining velocity component is the axial movement of particles toward the larger inside diameter portion of the rotating collector. The system engineer has an opportunity to adjust this velocity (by manipulating wall angle, average inside diameter and RPM) to control sliding wear. (Impact may not play a major role in wearing the inside surface of the rotating wall. The opportunity exists to operate the device with a continuous "film" of powders moving across its surface. In that case, incoming particles collide with captured particles, not the wall material.)

3) Particle re-entrainment should be minimal. One objective of the separator is to minimize gas velocity within the assembly, reducing both frictional losses and particle re-entrainment. A gas stream's ability to convey particles increases with its velocity and decreases with the apparent mass of the particles. Differential acceleration by a rotating wall technique accomplishes this goal.

Particles moving with the rotating wall will, however, locally increase gas velocity and change its direction. As the particle diameters are very small relative to the dimension of the chamber containing the gas, only a boundary layer is created. Boundary layer phenomena have the potential to reduce frictional losses of gas flowing through pipes and the system engineer has the opportunity to beneficially create boundary layer in the disclosed separator.

Some rotational gas flow may be acceptable or, in some cases, beneficial. For instance, near the input end of the separator, larger particles may be more efficiently removed with a combination of reversing radial flow and increasing tangential flow. As the gas stream moves through the separator, gas velocity can be reduced by removing the tangential component and adjusting chamber geometry, so that finer particles may be separated.

In all cases, "settled" particles, those moving with the wall, will have an apparent density far exceeding the lower limit at which the moving gas could entrain and convey them. In fact, the apparent particle density will be so great that substantial increases in gas density or viscosity could be tolerated. This permits engineering a unit for compressed gas operation, an important benefit for chemical synthesis and pipeline operations.

The assembly has an axial inlet for particle-laden gas, an axial outlet for cleaned gas and either a concentric axial outlet or one or more radial outlets for separated particulates. The separator is capable of bi-directional flow, that is, the inlet may either be at the large opening of the rotating frusto-conical section or at the small end. Further, the separator may be operated in various horizontal, vertical or oblique orientations.

Multi-phase flows travel axially into the device and then is directed radially through one or more pairs of vanes. Flow may enter the device at any point between the axis and the outer wall. The vanes may be arranged to periodically reverse the radial flow in the immediate vicinity of the wall.

At each flow reversal, some or all of the particles entrained in the flow will impact the rotating outer wall. Impacting particles may be accelerated by the rotating wall in a direction perpendicular to flow and eventually collect at the rotating wall. Since acceleration of the gas stream or rotational flow of the gas stream are not required, the separator minimizes energy loss to the gas stream.

The inside diameter of the hollow rotating collector may vary, forcing collected particles to travel axially in the direction of increasing diameter. At the location(s) of greater inside diameter, a discharge conveys particles out of the collector into a suitable chamber, or to the surrounding atmosphere. The rotating collector arrangement has the further advantage of minimizing or eliminating problems related to angle of repose and bridging of collected particles.

The foregoing disclosure and description of the invention is illustrative and explanatory of preferred embodiments. It would be appreciated by those skilled in the art that various changes in the size, shape of materials, as well in the details of the illustrated construction or combination of features discussed herein maybe made without departing from the spirit of the invention, which is defined by the following claims.

What is claimed is:

1. A method for separating particles from a fluid-particle stream, comprising:
   rotating a hollow collector;
   directing flow of the stream radially outward to an interior surface of the rotating hollow collector; and
   thereafter directing flow of the stream radially inward away from the interior surface of the rotating hollow collector while impacting the rotating collector with particles, such that impacted particles move rotationally about a central axis of the rotating collector.

2. A method according to claim 1, further comprising:
   reversibly directing the fluid-particle stream in a radial direction by two or more vanes positioned within the rotating collector.

3. A method according to claim 2, further comprising:
   securing each vane relative to the rotating collector.

4. A method according to claim 2, further comprising:
   adjusting an axial position of the two or more vanes with respect to the rotating collector.

5. A method according to claim 2, further comprising:
   selecting the two or more vanes from a group consisting of disks, frusto-conical sections and parabolic sections, each vane having a substantially circular outer edge.

6. A method according to claim 2, further comprising:
   providing the two or more vanes to direct flow of the stream which are flexible; and
   providing a deflection device to deflect the two or more vanes.

7. A method according to claim 1, further comprising:
   providing a plurality of alternating vanes which are each substantially imperforate; and
   providing a plurality of intervening vanes each containing one or more perforations adjacent its center, with an outer edge of each imperforate vane positioned substantially farther from the hollow collector than an outer edge of each intervening, perforated vane to direct the fluid-particle stream in a radially reversing manner at the outer edge of each imperforate vane.

8. A method according to claim 7, further comprising:
   positioning the outer edge of each perforated vanes sufficiently close to the interior surface of the hollow collector to substantially restrict fluid from flowing between the vane and the collector, while allowing passage of collected particles past the outer edge of the vane.

9. A method according to claim 1, further comprising:
   increasing a thickness of the outer edge of an imperforate vane compared to a radially central section of the imperforate vane such that radially outward flow is directed along the interior surface of the rotating collector before being directed radially inward.

10. A method according to claim 1, further comprising:
    using one or more of electrostatic and magnetic forces to increase particle impact on the rotating collector.

11. A method according to claim 1, further comprising:
    rotating the plurality of vanes along a central axis of the hollow collector at a different rotational speed than the hollow collector.

12. A method according to claim 1, further comprising:
    forming the rotating collector with one or more of surface frictional, electrostatic, and magnetic properties to increase particles impacting the interior surface of the collector.

13. A method according to claim 1, further comprising:
    accelerating impacted particles at substantially a tangential speed of the rotating collector, thereby reducing a tendency of collected particles to become re-entrained in fluid.

14. A method according to claim 1, further comprising:
    varying the rotational speed of the rotating collector.

15. A method according to claim 1, further comprising:
    rotating the collector to apply a force to the impacted particles greater than about 4 times the force of the Earth's gravity.

16. A method according to claim 1, further comprising:
    forming the interior surface of a rotating hollow collector with a varying internal diameter to direct particles toward a particle outlet.

17. A method according to claim 1, further comprising:
    forming the interior surface of the rotating hollow collector to enhance frictional engagement with particles.

* * * * *